Patented Oct. 3, 1950

2,524,643

UNITED STATES PATENT OFFICE 2,524,643

3-PHENYL-2-PIPERIDONES

Lewis A. Walter, East Orange, and Richard H. Barry, Arlington, N. J., assignors to Maltbie Laboratories, Inc., a corporation of New Jersey No Drawing. Application December 4, 1947, Serial No. 789,756

9 Claims. (Cl. 260—293)

This invention relates to a new and useful composition of matter, namely, a substituted 2-piperidone of the formula:

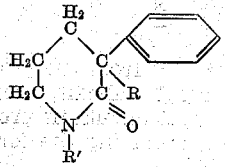

wherein R represents an alkyl or an aryl radical and R' represents hydrogen, an alkyl or an aralkyl radical.

In the formula given above the positions are numbered as follows for the purposes of the nomenclature herein used: the nitrogen shown at the bottom of the ring to which a substituent represented by R' is bonded is the 1-position; the carbon atom connected to oxygen by a double bond is at the 2-position; and the carbon atom bonded to phenyl and to a substituent represented by R is at the 3-position, etc. Thus R represents a substituent bonded to the carbon at the 3-position and R', a substituent bonded to nitrogen at the 1-position.

These compounds have been tested pharmacologically and found to possess valuable anticonvulsant properties. They are also useful intermediates in organic syntheses, particularly in the preparation of similarly substituted piperidines.

The piperidones which are the subject of this invention may be prepared by the catalytic hydrogenation of the appropriately substituted γ-cyanobutyric esters, which in turn, are readily available by the well-known cyanoethylation procedure of Bruson, as set forth in Journal of the American Chemical Society, vol. 65, page 23, (1943).

EXAMPLE I

3,3-diphenyl-2-piperidone

This compound is one in which R represents phenyl ($C_6H_5$) and R' represents hydrogen.

A solution of 116 g. of methyl diphenylacetate in 200 ml. of peroxide-free dioxane was treated with one gram of sodium methoxide and kept at 40–50° C. while 27 g. of acrylonitrile was added dropwise with stirring. When the addition was complete the mixture was heated at 60–70° C. for one hour. The dioxane was removed in vacuo and the residue was taken up in ether, washed with water, and dried. The ether was distilled to leave a residue of methyl α,α-diphenyl-γ-cyanobutyrate which was crystallized from methanol, to give material melting at 123–124° C.

Thirty grams of this ester, 160 ml. of methanol containing 30 g. of anhydrous ammonia, and 3 g. of Raney-nickel catalyst (finely divided nickel prepared for use as a hydrogenation catalyst) were sealed in a bomb and hydrogenated at 100–125° C. under an initial hydrogen pressure of 1000 lbs./sq. in. until no more hydrogen was absorbed. The bomb was cooled, the pressure was released, and the contents of the bomb were removed and heated with enough additional methanol to dissolve the product. The catalyst was then removed by filtration, and on cooling crystals of 3,3-diphenyl-2-piperidone, M. P. 186–187.5° C. uncorrected, separated.

EXAMPLE II

3-phenyl-3-alkyl-2-piperidones

This group of compounds are those in which R is an alkyl radical, specifically one having from 1 to 4 carbon atoms, which are presently considered the more desirable pharmacologically as compared with longer chain substituents, and wherein R' is hydrogen.

(a) In this particular compound, R represents an ethyl radical ($C_2H_5$). This compound was prepared as follows: One hundred seventy-eight grams of methyl α-phenylbutyrate and 1 gram of sodium methoxide were stirred at 40–50° C. and 55 grams of acrylonitrile was added dropwise. The mixture was heated at 60–70° C. for one hour after the addition was complete. The material was taken up in ether, washed with water, dried and distilled to give methyl α-phenyl-α-ethyl-γ-cyanobutyrate, B. P. 145–150° C. at 2 mm.

Forty grams of this ester, 140 ml. of methanol containing 25 grams of anhydrous ammonia, and 3 grams of Raney-nickel catalyst was sealed in a bomb and hydrogenated at 100° C. with hydrogen at 1000 lbs. pressure until no more hydrogen was absorbed. The bomb was cooled, the pressure released, and the contents of the bomb were removed. In this instance the product had crystallized out and, in order to remove the catalyst, the mixture was heated to boiling and filtered. On cooling, pure 3-phenyl-3-ethyl-2-piperidone separated as white crystals M. P. 124–125° C. Additional material was obtained by distilling the mother liquors. The product distilled at 140–150° C. at 2 mm.

(b) In this particular compound, R represents a n-propyl radical ($C_3H_7$). This compound was prepared using the same procedure, methyl α-phenyl valerate and acrylonitrile gave methyl α-phenyl-α-n-propyl-γ-cyanobutyrate B. P. 140–145° C. at 0.5–1.0 mm. This ester on hydrogenation as described gave 3-phenyl-3-n-propyl-2-piperidone, B. P. 150–155° C. at 2 mm., which crystallized from methyl isobutyl ketone to give white crystals melting at 103–104° C.

(c) In this particular compound, R represents a n-butyl radical ($C_4H_9$). In preparing this compound, methyl α-phenylcaproate and acrylonitrile similarly gave methyl α-phenyl-α-n-butyl-γ-cyanobutyrate, B. P. 160–165° C. at 1.5 mm. This ester on hydrogenation as described gave 3-phenyl-3-n-butyl-2-piperidone, B. P. 170–175° C. at 2 mm., which melted at 70–72° C. when crystallized from hexone.

(d) In this particular compound, R represents an isobutyl radical ($C_4H_9$). In preparing this compound, methyl α-phenylisocaproate and acrylonitrile gave methyl α-phenyl-α-isobutyl-γ-cyanobutyrate, B. P. 145–150° C. at 1 mm. This ester on hydrogenation gave 3-phenyl-3-isobutyl-2-piperidone, B. P. 150–160° C. at 2 mm., which melted at 87–88.5° C. when crystallized from hexone.

EXAMPLE III

1-alkyl-3-phenyl-3-ethyl-2-piperidones

This group of compounds are those in which R represents an ethyl radical ($C_2H_5$) and R′ represents an alkyl radical, specifically one having from 1 to 4 carbon atoms, which are presently considered the more desirable pharmocologically as compared with longer chain substituents.

(a) In this particular compound R′ represents a methyl radical ($CH_3$). In preparing this compound, two and three-tenths grams of sodium was finely powdered in 500 ml. of toluene in the usual manner. Twenty grams of 3-phenyl-3-ethyl-2-piperidone was added and the mixture was stirred until all the sodium had reacted. Thirteen grams of methyl sulfate was added and the mixture was refluxed for an hour. The toluene solution was washed with dilute ammonia, dried, and distilled to give 1-methyl-3-phenyl-3-ethyl-2-piperidone, B. P. 125–130° C. at 2 mm. This material was crystallized from ether-ligroin and melted at 54.5–56° C.

(b) In this particular compound R′ represents an ethyl radical ($C_2H_5$). This compound may be prepared by treatment of the sodium derivative of 3-phenyl-3-ethyl-2-piperidone, prepared as described above, with ethyl sulfate to give 1-ethyl-3-phenyl-3-ethyl-2-piperidone, B. P. 140–147° C. at 3 mm., which melted at 50–51° C. when crystallized from ether-ligroin.

(c) In this particular compound R′ represents a n-butyl radical ($C_4H_9$). This compound may be prepared in a like manner by treatment of the sodium derivative of 3-phenyl-3-ethyl-2-piperidone with n-butyl bromide to give 1-n-butyl-3-phenyl-3-ethyl-2-piperidone, B. P. 154–160° C. at 2 mm.

EXAMPLE IV

In this group of compounds, R represents ethyl, as an example of alkyl substituent radicals, and R′ represents an aralkyl radical, specifically benzyl (—$CH_2 \cdot C_6H_5$). As an example of the preparation of a compound of this class 1-benzyl-3-phenyl-3-ethyl-2-piperidone was also prepared by treating the sodium derivative of 3-phenyl-3-ethyl-2-piperidone with benzyl chloride. It distilled at 185–195° C. at 2 mm., and melted at 50–53° C. when crystallized from ether-ligroin.

What is claimed is:

1. A 2-piperidone having the formula:

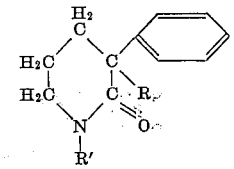

wherein R represents a substituent at the 3-position which is selected from the group consisting of a phenyl and alkyl radicals, and R′ represents a substituent at the 1-position which is selected from the group consisting of hydrogen and alkyl and phenalkyl radicals, such compounds having valuable anticonvulsant properties.

2. A 2-piperidone having the formula

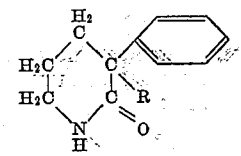

wherein R is selected from the group consisting of phenyl and alkyl radicals, such compounds having valuable anticonvulsant properties.

3. A 2-piperidone having the formula

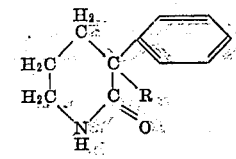

wherein R represents an alkyl group, such compounds having valuable anticonvulsant properties.

4. A 2-piperidone having the formula

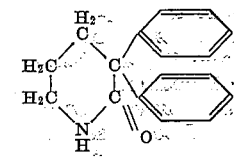

this compound having valuable anticonvulsant properties.

5. A 2-piperidone having the formula

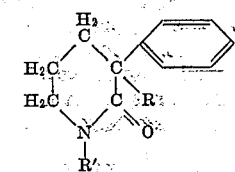

wherein R is selected from the group consisting of a phenyl and alkyl radicals, and wherein R′ represents an alkyl group, such compounds having valuable anticonvulsant properties.

6. A 2-piperidone having the formula

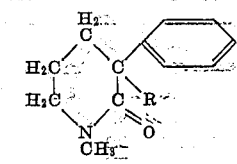

wherein R is selected from the group consisting of a phenyl and alkyl radicals, such compounds having valuable anticonvulsant properties.

7. 1-methyl-3-phenyl-3-ethyl-2-piperidone.
8. 3-phenyl-3-ethyl-2-piperidone.
9. 3,3-diphenyl-2-piperidone.

LEWIS A. WALTER.
    RICHARD H. BARRY.

REFERENCES CITED

The following references are of record in the file of this patent:

UNITED STATES PATENTS

| Number | Name | Date |
|---|---|---|
| 2,383,444 | Bruson | Aug. 28, 1945 |

FOREIGN PATENTS

| Number | Country | Date |
|---|---|---|
| 90,069 | Germany | Nov. 30, 1896 |
| 103,541 | Great Britain | Feb. 17, 1917 |
| 568,759 | Germany | Jan. 23, 1933 |
| 571,227 | Germany | Apr. 7, 1933 |
| 653,307 | Germany | Nov. 22, 1937 |

OTHER REFERENCES

Aschan: Ber der Deu. Chem., 23, 3694 and 3700 (1890).